(12) United States Patent
Cerasuolo

(10) Patent No.: US 12,092,432 B2
(45) Date of Patent: Sep. 17, 2024

(54) GLIDE TRAJECTORY OPTIMIZATION FOR AEROSPACE VEHICLES

(71) Applicant: Ed Frank Cerasuolo, Sterling, VA (US)

(72) Inventor: Ed Frank Cerasuolo, Sterling, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 401 days.

(21) Appl. No.: 17/061,787

(22) Filed: Oct. 2, 2020

(65) Prior Publication Data

US 2022/0107160 A1   Apr. 7, 2022

(51) Int. Cl.
| | |
|---|---|
| *F41G 7/30* | (2006.01) |
| *F41G 7/34* | (2006.01) |
| *G05D 1/00* | (2006.01) |
| *G06F 17/17* | (2006.01) |

(52) U.S. Cl.
CPC ............. *F41G 7/306* (2013.01); *F41G 7/346* (2013.01); *G05D 1/0094* (2013.01); *G05D 1/107* (2013.01); *G05D 1/12* (2013.01); *G06F 17/17* (2013.01)

(58) Field of Classification Search
CPC ....... F41G 7/306; F41G 7/346; G05D 1/0094; G05D 1/107; G05D 1/12
See application file for complete search history.

(56) References Cited

U.S. PATENT DOCUMENTS

| | | | | |
|---|---|---|---|---|
| 6,573,486 B1* | 6/2003 | Ratkovic | ............... | F41G 7/36 |
| | | | | 244/3.2 |
| 8,650,000 B2 | 2/2014 | Africa, Jr. et al. | ........... | 702/141 |
| 8,914,253 B2* | 12/2014 | Africa, Jr. | ............... | F41H 11/02 |
| | | | | 702/144 |
| 9,633,567 B1* | 4/2017 | Skoog | ................... | B64D 45/04 |

(Continued)

OTHER PUBLICATIONS

Chern, J.-S. et al.: "Optimum Reentry Trajectories of a Lifting Vehicle" NASA CR 3236, 1980. https://ntrs.nasa.gov/archive/nasa/casi.ntrs.nasa.gov/19800007820.pdf.

Vinh, N. X. et al.: "Phugoid Oscillations in optimal reentry trajectories" Acta Astro. 8 311-24, 1981. https://deepblue.lib.umich.edu/bitstream/hand.e/2027.42/24410/0000680.pdf.

(Continued)

*Primary Examiner* — Marcus E Windrich
(74) *Attorney, Agent, or Firm* — Gerhard W. Thielman

(57) ABSTRACT

A computer implemented method is provided for in-flight trajectory steering a vehicle by an optimal path to a destination. This includes incorporating physical constants; setting initial angle of attack (AoA) and initial AoA rate; incrementing flight AoA; measuring operation parameters; establishing a flight trajectory; calculating an optimal trajectory; comparing flight trajectories; and commanding flight control. The physical constants include gravity and atmospheric conditions. The flight AoA increments from the initial AoA and any prior increments. The operation parameters of the vehicle include pressure, velocity and flight path angle. The flight trajectory denotes the vehicle's path to its destination based on the operation parameters using the physical constants. The optimal trajectory is based on with altitude and velocity of the vehicle. The flight trajectory is compared to the optimal trajectory as a steering correction by altering the flight AoA. The vehicle's flight control executes the steering correction at the flight AoA.

16 Claims, 10 Drawing Sheets

(56) References Cited

U.S. PATENT DOCUMENTS

| | | | | |
|---|---|---|---|---|
| 10,776,450 | B1* | 9/2020 | Hansen | G06F 17/13 |
| 2004/0188561 | A1* | 9/2004 | Ratkovic | G01C 21/165 |
| | | | | 244/3.1 |
| 2006/0185506 | A1* | 8/2006 | Strand | F41G 3/142 |
| | | | | 89/41.03 |
| 2009/0001215 | A1* | 1/2009 | Bredy | F41G 7/346 |
| | | | | 244/3.15 |
| 2011/0118912 | A1* | 5/2011 | Shuster | G05D 1/105 |
| | | | | 701/18 |
| 2014/0067312 | A1* | 3/2014 | Africa, Jr. | F41H 11/02 |
| | | | | 702/141 |
| 2018/0306563 | A1* | 10/2018 | Lotan | F42B 10/26 |
| 2022/0026179 | A1* | 1/2022 | Kolanek | G01S 13/426 |
| 2022/0061788 | A1* | 3/2022 | Kobayashi | G05D 1/106 |
| 2022/0334582 | A1* | 10/2022 | Bryner | B62D 53/02 |
| 2023/0062792 | A1* | 3/2023 | Ergen | B64C 39/024 |

OTHER PUBLICATIONS

NIMA TR 8350.2, 3/e 2003. http://earth-info.nga.mil/GandG/publications/tr8350.2/wgs84fin.pdf.
1962 Standard Atmosphere—ESSA, NASA, USAF. https://apps.dtic.mil/dtic/tr/fulltext/u2/659893.pdf.
1966 Supplements—NOAA, NASA, USAF. https://ntrs.nasa.gov/archive/nasa/casi.ntrs.nasa.gov/19670028571.pdf.
1976 Standard Atmosphere—NOAA, NASA, USAF. https://apps.dtic.mil/dtic/tr/fulltext/u2/a035728.pdf.
Stengel. R. F.: Flight Dynamics Princeton, 2004, §2.3, p. 61.
Luus, R.: Iterative Dynamic Programming 2000 §§10.1, 11.2.2. https://www.mobt3ath.com/ uplode/book/book-21416.pdf.
Rao, A. V.: "A Survey of Numerical Methods for Optimal Control" AAS 09-334 2010. http://www.anilvrao.com/Publications/ConferencePublications/trajectorySurveyAAS.pdf.

* cited by examiner

| Quantity | Description | 500 |
|---|---|---|
| $m$ | Body mass | |
| $S$ | Body aerodynamic reference area | |
| $a$ | Equatorial Earth Radius | |
| $\Omega$ | Earth Rotation Rate (rads/s) | |
| $C_{D_{a,b,c}}$ | Drag coefficient tables as a function of altitude and Mach or Knudsen number | |
| $C_{L_{d,e}}$ | Lift coefficient tables as a function of altitude and Mach or Knudsen number | |
| $\mu$ | Gravitational Constant | |
| $J_2$ | Gravitational Constant ($2^{nd}$ order) | |
| $J_3$ | Gravitational Constant ($3^{rd}$ order) | |
| $J_4$ | Gravitational Constant ($4^{th}$ order) | |

Table 1. Input Body, Earth, Gravity and Aerodynamic Model Parameters

FIG. 5

| Number (A) | Latitude | Description 600 |
|---|---|---|
| 1 | 45 degrees N | 1962, 1976 Standard |
| 2 | 15 degrees N | Annual |
| 3 | 30 degrees N | Winter |
| 4 | 30 degrees N | Summer |
| 5 | 45 degrees N | Winter |
| 6 | 45 degrees N | Summer |
| 7 | 60 degrees N | Winter |
| 8 | 60 degrees N | Summary |
| 9 | 60 degrees N | Winter (cold) |
| 10 | 60 degrees N | Winter (warm) |
| 11 | 75 degrees N | Winter |
| 12 | 75 degrees N | Summary |
| 13 | 75 degrees N | Winter (cold) |
| 14 | 75 degrees N | Winter (warm) |

Table 2. 1962 Standard, 1976 Standard and 1966 Supplemental Atmospheres

FIG. 6

| Quantity | Description 700 |
|---|---|
| $R_{Dp}$ | Geodynamic Radius |
| $R_{ideal}$ | Ideal Gas Constant |
| $Z_i$ | Table of i geometric altitudes |
| $T_i$ | Table of i molecular scale temperatures |
| $\mu_0$ | Initial viscosity used in Sutherland's Law for Viscosity |
| $c_{sutherland}$ | Constant used in Sutherland's Law for Viscosity |
| $P_0$ | Sea Level Pressure |

Table 3. Atmosphere Parameters

FIG. 7

| Quantity | Description | 800 |
|---|---|---|
| $t_0$ | Initial trajectory time | |
| $\Delta t$ | Trajectory Time Step | |
| $h_0$ | Initial trajectory altitude | |
| $h_{end}$ | Altitude to end trajectory simulation | |
| $S_0$ | Initial trajectory range | |
| $V_0$ | Initial earth relative trajectory velocity magnitude | |
| $\gamma_0$ | Initial flight path angle | |
| $\varphi_0$ | Initial latitude | |
| $\lambda_0$ | Initial Longitude | |
| $A_{z0}$ | Initial Azimuth | |

Table 4. Initial Trajectory Quantities

FIG. 8

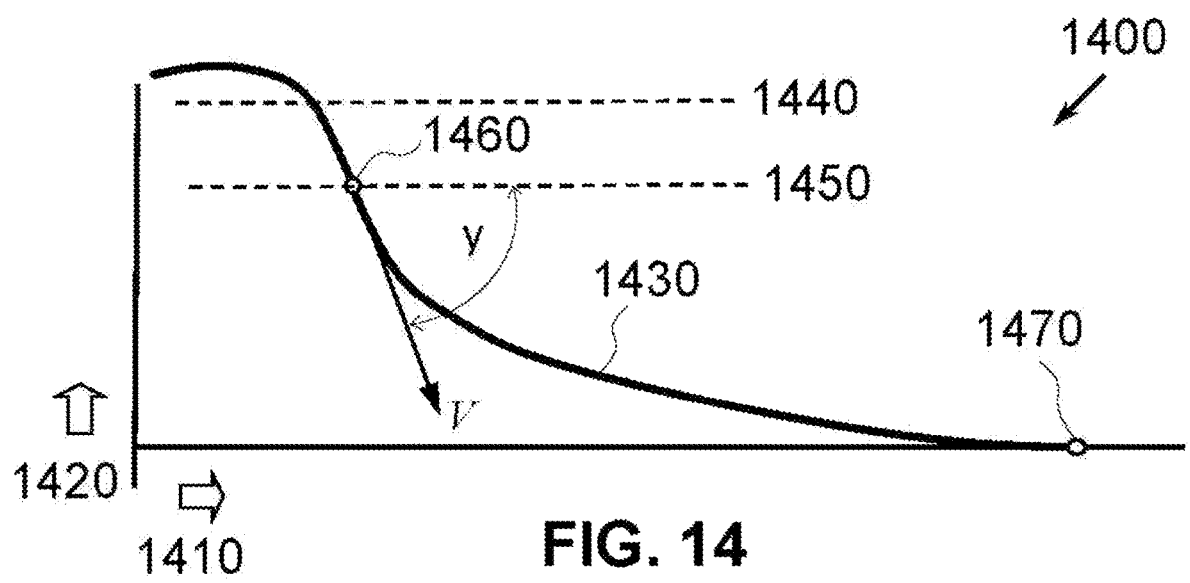

FIG. 14

| Variable | Description |
|---|---|
| | 900 |
| $t$ | Trajectory time elapsed since trajectory start time |
| $r$ | Distance from center of Earth (radius of earth + altitude) |
| $h$ | Altitude (above sea level) |
| $S$ | Range on the surface of the Earth |
| $V$ | Trajectory earth relative velocity magnitude |
| $\gamma$ | Flight path angle |
| $m$ | Mass of aerospace vehicle |
| $D$ | Drag Force |
| $L$ | Lift Force |
| $g$ | Acceleration due to gravity |
| $\alpha$ | Total angle of attack (from body axis to velocity vector) |
| $\rho$ | Density of atmosphere |
| $\bar{q}$ | Dynamic Pressure |
| $C_D$ | Drag Coefficient (total) |
| $C_L$ | Lift Coefficient (total) |
| $\theta$ | Range angle |

Table 5. Equations of Motion Variables List

FIG. 9

| Quantity | Description |
|---|---|
| $\alpha_{max}$ | Maximum angle of attack allowed for body |
| $\dot{\alpha}_{max}$ | Maximum time rate of change of angle of attack allowed for body |
| $h_{test}$ | Test altitude for ending Pull-Down arc |
| $\gamma_{min}$ | Minimum flight path angle constraint for end of Pull-Down arc |
| $\gamma_{max}$ | Maximum flight path angle constraint for end of Pull-Down arc |
| $V_{min}$ | Minimum velocity constraint for end of Pull-Down arc |
| $V_{max}$ | Maximum velocity constraint for end of Pull-Down arc |

Table 6. Trajectory Optimization Required Input Parameters

FIG. 15

GLIDE TRAJECTORY OPTIMIZATION FOR AEROSPACE VEHICLES

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to steering law guidance of hypersonic vehicles capable of both gliding and thrusting with a scramjet engine. In particular, the invention relates to the in-flight determination of the optimal steering path for the trajectories of missiles and aircraft.

Over the last few decades a variety of both powered, unpowered, manned and unmanned aerospace vehicles, launched via sleds, rockets or airplanes, designed to glide at high altitudes have been proposed and tested. Examples by Olds: " . . . POST" include the MagLiffer, Cerberis I and Cerberis II (http://www.ssdl.gatech.ed/sites/dfault/files/papers/conferencePapers/AIAA-1998-0302.pdf, 1998). Possible planned applications for these prototype vehicles included next generation sensor surveillance, communications, weather observations, micrometeorite dust measurements, anti-satellite weapons, high-speed aerospace flow field and body heating research and the high speed delivery of payloads.

Some powered prototypes were designed to be launched to a set altitude and begin a glide trajectory in order to initiate a ramjet or scramjet engine for flying into a low earth orbit. Unpowered prototype versions of powered vehicles have been drop tested into a glide trajectory in order to test the structural integrity of the vehicle. An example was the testing performed for the X-37 spaceplane. One optimal glide pattern is a constant dynamic pressure glide, which differs from other glide patterns such as a phugoid (steer-up) glide pattern, also known as a skip trajectory from Chem: "Optimum Reentry Trajectories . . . " NASA CR 3236 (https://ntrs.nasa.gov/archive/iasalcasi.ntrs.nasa.gov/19800007820.pdf, 1980) and Vinh: "Phugoid Oscillations in optimal reentry trajectories" Acta Astro. 8 311-24 (https://deepblue.lib.umich.edu/bitstream/handle/2027.42/24410/0000680.pdf, 1981).

Compared to a constant dynamic pressure glide path, phugoid glide trajectories increase the aerothermodynamic heating of the vehicle aeroshell thermal protection system and increase the structural loads which create added stress and strain on the vehicle aeroshell and substrate. Also a constant dynamic pressure glide path is considered optimal for the atmospheric and dynamic conditions necessary for the successful startup of a scramjet engine.

For a given initial velocity and atmospheric density (based on altitude), there is an optimal constant dynamic pressure glide. Computing this trajectory yields an initial optimal flight path angle that the vehicle must have. Also, because the vehicle has drag and lift coefficients that depend on the angle of attack (AoA), an AoA must be computed. To achieve maximum glide range, the AoA history for the entire glide must be computed. Thus, a time rate of change of the angle of attack (AoA rate) history must be computed as well.

For a preplanned flight, the AoA and AoA rate history could be input into the flight control computer of the vehicle so that its body maintains a preplanned optimal glide trajectory. In addition, the glide part of the total flight of the vehicle must be optimally joined with the trajectory that positions the vehicle to the beginning of the glide. This could arise via launch from earth or drop from an airplane. Then, the glide trajectory at the end of the glide must be joined with a trajectory that either returns the vehicle to a landing point on earth or inserts the vehicle into a low earth orbit.

In addition, the nominal flight scenario of the vehicle consists of a trajectory segment (boost arc 440 in FIG. 4) that boosts the vehicle to the beginning of the glide trajectory segment (glide arc 460 in FIG. 4). This can be accomplished via launch from the earth or a vehicle drop from an airplane. Then the end of the glide trajectory segment must be joined with a trajectory segment that either returns the vehicle to a landing point on earth or inserts the vehicle into a low earth orbit (landing arc 480 in FIG. 4).

A wide variety of trajectory optimization computation techniques exist that are generally used with a trajectory simulation code to generate an optimal trajectory and perform Monte Carlo analysis. Past trajectory optimization techniques have used simplifying assumptions that limit the practical applicability of the results. Some of these assumptions include constant lift to drag ratios, cubic polynomial AoA steering, a spherical earth/gravity approximation and a simple exponential density model for the earth's atmosphere.

There are several commercially available software packages that can compute optimal multi-phase trajectories. These include the NASA OTIS code, the MATLAB GPOPS code and the Stanford Business School code SNOPT. However, these packages are expensive, have a long execution time, require powerful, expensive computers and sometimes require an operator in the loop to perform computation interventions during the computation process.

SUMMARY

Conventional trajectory determining techniques yield disadvantages addressed by various exemplary embodiments of the present invention. Exemplary embodiments provide a fast algorithm for computing the total optimal trajectory for a gliding or powered vehicle that will have planned multi-arcs (or phases) including a maximum range or maximum velocity constant dynamic pressure glide arc. In particular, various exemplary embodiments provide a computer implemented method for trajectory steering while in-flight a vehicle by an optimal path to a destination.

The exemplary method includes incorporating physical constants; setting initial angle of attack (AoA) and initial AoA rate; incrementing flight AoA; measuring operation parameters; establishing a flight trajectory; calculating an optimal trajectory; comparing flight trajectories; and commanding flight control. The plurality of physical constants include for gravity and atmospheric conditions, the latter typically provided in tabular form. The flight AoA increments from the initial AoA and any prior increments.

The plurality of operation parameters of the vehicle includes pressure, velocity and flight path angle. The flight trajectory denotes the path of the vehicle to its destination based on the operation parameters using the physical constants. The optimal trajectory is based on altitude (i.e., corresponding physical constants) and velocity (based on measured operation parameters) of the vehicle. The flight trajectory is compared to the optimal trajectory as a steering correction by altering the flight AoA. The vehicle's flight control involves executing the steering correction at the flight AoA.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 5 is a tabular view of input model environment parameters;

FIG. 6 is a tabular view of atmospheric region and season options;

FIG. 7 is a tabular view of atmospheric parameters;

FIG. 8 is a tabular view of trajectory initialization values;

FIG. 9 is a tabular view of equations of motion variables;

FIG. 14 is a graphical view of a glide to approach trajectory;

FIG. 15 is a tabular view of trajectory optimization inputs.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, artisans of ordinary skill will readily recognize that devices of a less general purpose nature, such as hardwired devices, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related components.

Figure 1:
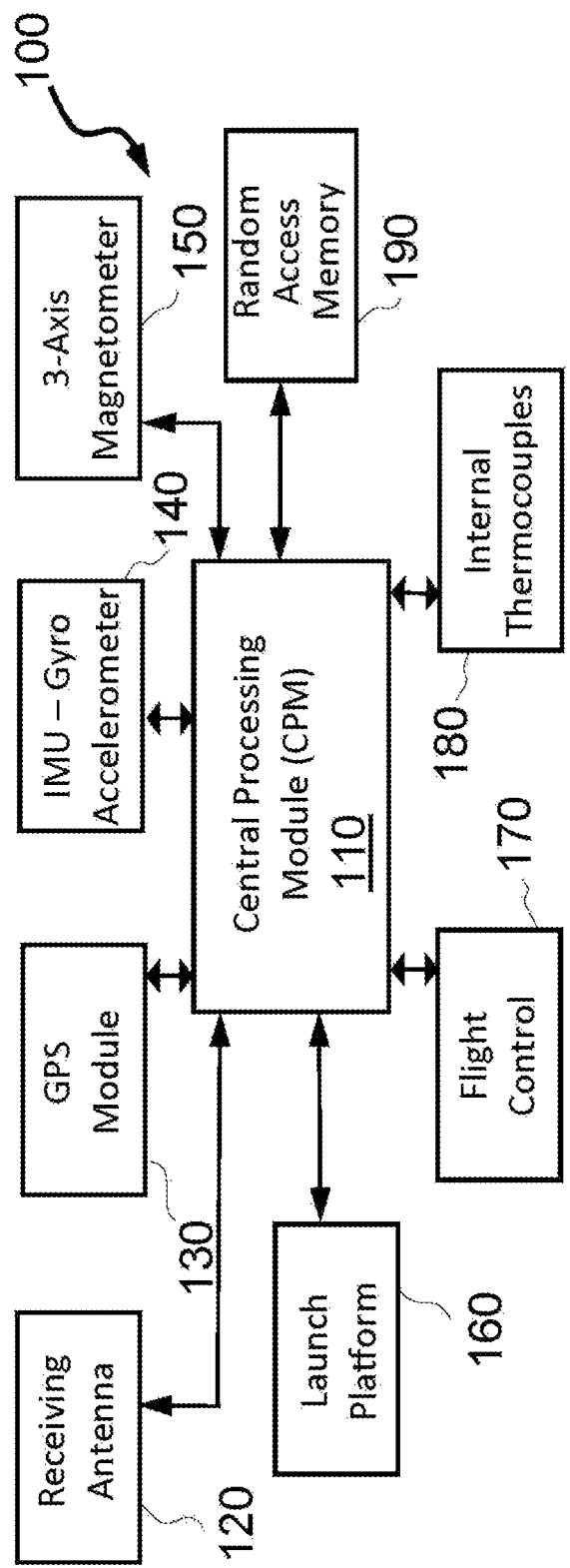
FIG. 1 is a block diagram view of missile navigator modules.

FIG. 1 shows a block diagram view 100 of exemplary hardware modules associated with a flight vehicle, e.g., missile. These components include a command issuing central processing module (CPM) 110, a receiving antenna 120, a global positioning system (GPS) module 130, an inertial measurement unit (IMU) 140, a three-axis magnetometer (TAM) 150, a launch platform 160, a flight controller 170, internal body thermocouples 180 and a random access memory (RAM) 190.

The antenna 120 receives target coordinates from a remote command station. The GPS module 130 receives location information from GPS satellites. The inertial accelerometer 140 determines speed and direction changes during flight, and its gyroscope determines orientation changes during flight. The magnetometer 150 verifies location by measuring local fluctuations in the earth's magnetic field. The launch platform 160 provides targeting and other information from the launcher of the vehicle (e.g., missile). The flight controller 170 translates instructions from the CPM 110 to control surfaces on the airframe and/or engine to adjust the vehicle's trajectory path. The internal thermocouples 180 measure temperature to monitor the thermal operating environment of the internal components. The RAM 190 stores information from instruments to the CPM 110 until needed. Note that propulsive drives for the vehicle can include a variety of techniques, including rockets, scramjets, turbojets, turbofans, propellers, etc.

Sensors include the IMU 140 with an accelerometer and ring laser gyro, a three-axis magnetometer 150, and internal body thermocouples 180. The CPM 110 access data tables from the RAM 190 for trajectory presets needed to perform computations. The IMU 140 measures the specific forces acing on the vehicle and the vehicle Euler angles of orientation. The magnetometer 150 assists to update the current vehicle orientation. The internal thermocouples 180 safeguard against internal components reaching a temperature that exceed the component operating limits.

The CPM 110 represents a command central processing unit that fuses all of the measurement data using the appropriate filtering techniques to determine the vehicle's instant altitude, position, velocity, acceleration, orientation, flight path angle and angle of attack, while calculating the commands for angle of attack (AoA) and AoA rates to be sent to the flight controller 170. The flight path angle denotes the vehicle's attitude in relation to altitude change, as well as laterally for turning. The AoA represents the angular difference between the vehicle's longitudinal axis and the direction of flight, which can be in pitch or yaw.

Measurements from the IMU 140 are updated at specified time intervals via signals from GPS satellites that are filtered in the GPS module 130. Changes in the initial desired landing coordinates are relayed from satellite or ground based station signals received by the receiving antenna 120. Prior to launch, the launch platform 160 sends all of the preset parameters needed by the CPM 110, which computes and provides optimal AoA and AoA rate to the flight control system 170.

The exemplary algorithmic technique for this process technique generates a preplanned flight for the vehicle that can be uploaded to the CPM 110 via internal memory storage, e.g., RAM 190 on board prior to launch. The preplanned trajectory flight parameters are used by the CPM 110, which connects to a low cost GPS receiver module 130 and magnetometer-aided IMU 140 to provide small rapid adjustments to the optimal steering path in order to correct errors in the IMU-sensed trajectory path, as well as body orientation to account for differences between predicted and actual atmosphere and aerodynamic coefficients. When the antenna 120 receives a command to change the intended destination, the CPM 110 uses the exemplary computational method to generate a new optimal steering path for the vehicle to follow to the new destination.

Often, calculating an optimal trajectory quickly may be required, such as when performing Monte Carlo analyses, which require computing hundreds or thousands of trajectories. These analyses provide steering error bounds for the various parameters that affect the flight of the vehicle. The exemplary algorithm can be used to perform Monte Carlo trajectory runs rapidly. The exemplary algorithm can also be installed and used on board a glide vehicle to provide small, rapid adjustments to a planned optimal glide trajectory taking into account the Monte Carlo analysis computed steering and flight control limits.

Figure 2:
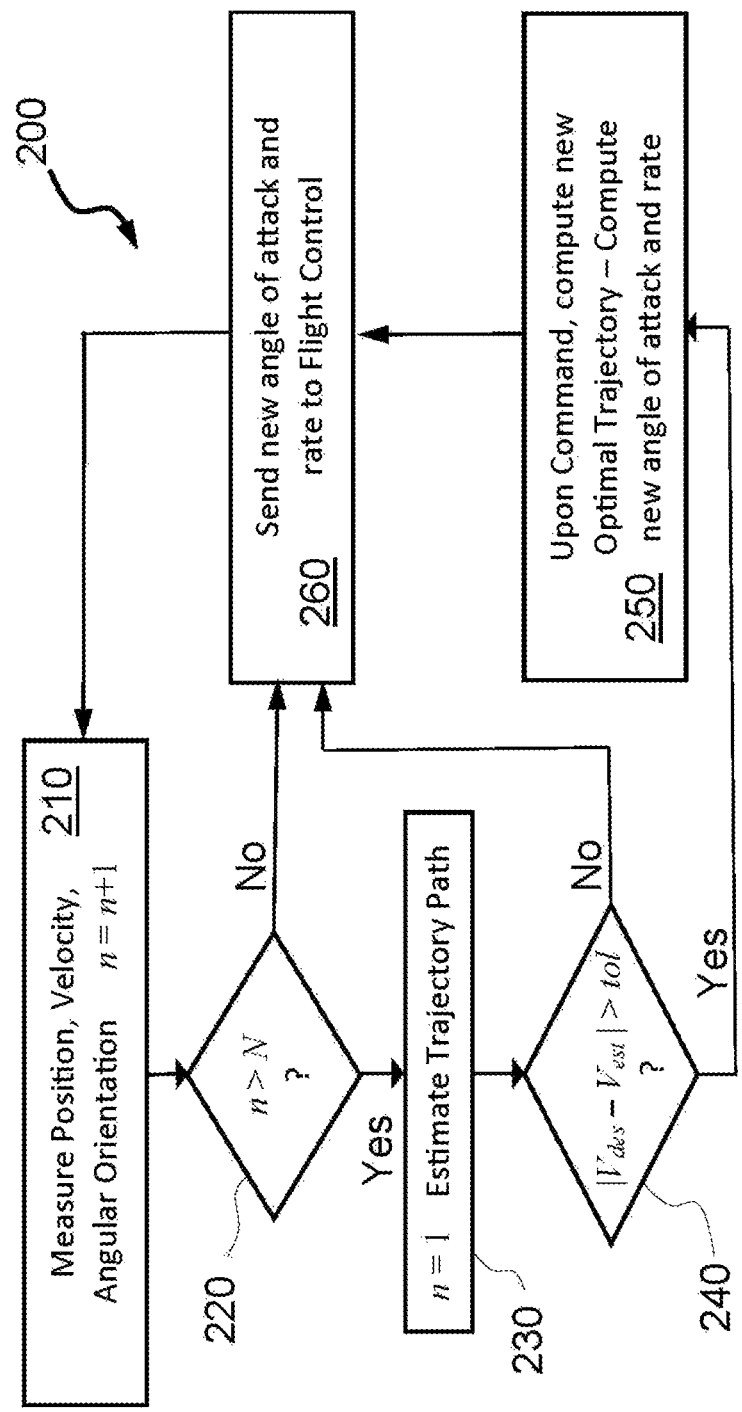
FIG. 2 is a flowchart view of a trajectory optimization process.

FIG. 2 shows a flowchart view 200 of the exemplary process operations. The flowchart 200 details the computations performed in the CPM 110. The process begins incrementally with measurement 210 of position, velocity and angular orientation. The process continues to first query 220 as to whether the increment has reached the final value. Upon so, the increment resets to estimate the trajectory path 230 followed by second query 240 of whether the difference between desired and estimated velocities is larger than a set tolerance. If so, then the process computes 250 a new optimal trajectory for a revised angle of attack and its rate. Following the computation 250, the process submits the revised values 260 to the flight controller 170 and return to the next increment 210. Otherwise if not for the first and second queries 220 and 240, the process jumps to submission 260.

The exemplary computational technique generates a nominal flight for the vehicle and then computes a collection of partial derivatives of the dynamic steering quantities that are uploaded to the CPU 110 via RAM 190 storage (as internal computer memory) on board the vehicle prior to launch. Monte Carlo analyses provide error bounds for the various partial derivatives that affect the vehicle's flight. If the receiving antenna 120 receives a command to change the intended vehicle destination, the CPM 110 uses the exemplary computational technique to generate a new optimal steering path for the vehicle to follow to the new destination.

Figure 3:
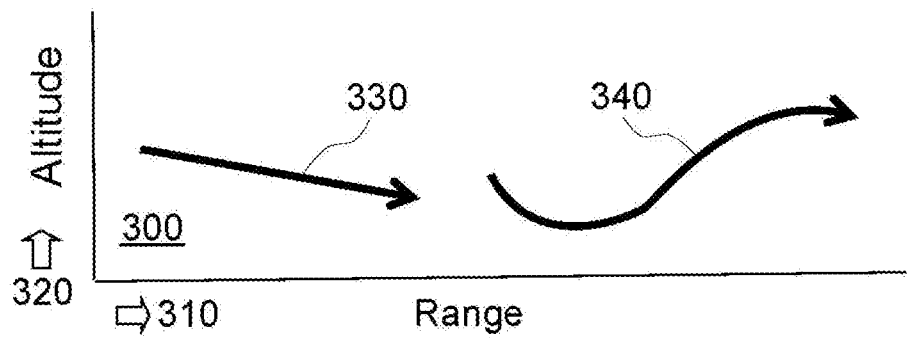
FIG. 3 is a graphical view of a flight glide trajectories.

FIG. 3 shows a graphical view 300 of trajectory comparisons for altitude and range of constant dynamic pressure and phugoid glide paths. Range 310 denotes the abscissa, while altitude 320 denotes the ordinate. The constant dynamic pressure glide path 330 provides aerodynamic and structural stability while enabling the vehicle to maximize its range and velocity by minimizing the kinetic energy loss due to drag. The phugoid glide path 340 has been proposed by Chem and Vinh to extend the range of very high altitude vehicles returning from space with suborbital velocities to extend its range around the earth. However, exemplary embodiments avoid the use of phugoid glide paths.

This exemplary computational technique incorporates a more realistic model than conventionally, using the world geodesic system 1984 (WGS84) supplemented by the earth gravity model 1996 (EGM96). The exemplary technique also incorporates rotating earth, oblate gravity mode-land models in the 1962 Standard, 1976 Standard or 1966 Supplemental for the atmosphere and any input density departure from one of these models, along with a wind profile. The exemplary algorithm also requires a set of aerodynamic lift and drag coefficients, which are functions of altitude, Mach number and angles of attack. These models yield more realistic and practical optimal trajectory results. The exemplary computational technique requires a set of aerodynamic lift and drag coefficients, which are tabular functions of altitude, Mach, Reynolds and/or Knudsen numbers and angles of attack. Together, these models yield realistic and practical optimal trajectory results.

WGS84 is available from NIMA TR 8350.2, 3/e (http://earth-info.nga.mil/GandG/publications/tr8350.2/wgs84fin.pdf, 2003). The 1962 Standard Atmosphere (https://apps.dtic.mil/diic/tr/fulltext/u2/659893.pdf), 1966 Supplements (https://ntrs.nasa.gov/archive/nasa/casi.ntrs-.nasa.gov/19670028571.pd/) and 1976 Standard Atmosphere (https://apps.dtic.mil/dic/tr/fulltext/2/a035728.pdf) were published by NASA.

Figure 4:
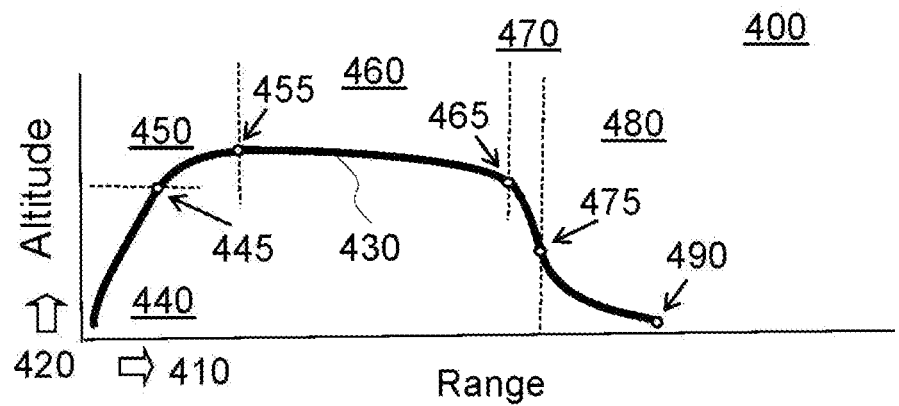
FIG. 4 is a graphical view of a trajectory region critical points.

FIG. 4 shows a graphical view 400 of trajectory arcs of a propelled projectile trajectory with Boost, Post Boost, Glide, Steer-Down and Approach arcs of an optimal vehicle flight. Range 410 represents the abscissa, while altitude 420 denotes the ordinate. The view 400 plots an example flight trajectory 430 of a vehicle over a series of different phases or arcs (as known in the parlance of trajectory optimization). The boost phase arc 440 ends at burnout 445 and represents the powered thrust portion of the flight. The post-boost phase arc 450 ends at peak altitude 455. The glide phase arc 460 ends at downturn 465. The steer-down phase arc 470 ends at the inflection point 475. The approach phase arc 480 ends upon landing at the target arrival 490, typically at the terrain altitude of the landing point (e.g., on the local ground).

One desires that each of these arcs has an optimal trajectory (such as for maximum range). The computations of the optimal glide arc 460 must incorporate the constraints and optimization requirements of the other arcs. In the Introduction, the trajectory segment corresponds to the boost phase arc 440, the glide trajectory segment corresponds to the glide phase arc 460 and the return segment corresponds to the approach phase arc 480.

FIG. 5 shows a tabular view 500 of Table 1 listing the required input body, earth, gravity and aerodynamic coefficient model parameters. The trajectory computations incorporate these inputs WGS84 values for the earth and gravity parameters from EGM96. The columns divide quantified symbol and parameter name as constants. FIG. 6 shows a tabular view 600 of Table 2 listing the Atmosphere models that may be input based on latitude and season. The forecast winds, densities and temperatures are represented by a table of density departures from one of the 1962 Standard, 1976 Standard or 1966 Supplemental Atmospheres. The required atmosphere quantities include sea level pressure, geometric altitude and molecular scale temperature in tabular form. The IMU 140 must be calibrated and aligned properly prior to launch. Also, the GPS module 130 necessitates acquisition of the triangulation signals from GPS satellites prior to launch.

FIG. 7 shows a tabular view 700 of Table 3 listing parameters required are the associated atmosphere parameters. The columns divide quantified symbol and parameter name as constants or tables based on altitude. FIG. 8 shows a tabular view 800 of Table 4 listing the trajectory initialization values that are input into the trajectory simulation. The columns divide quantified symbol and parameter name as initial conditions as related to vehicle launch. The choice of units, English or metric (Scientific International), is selectable by a mission planner (for instruction to the operator). FIG. 9 shows a tabular view 900 of Table 5 listing state variables for equations of motion. The columns divide quantified symbol and parameter name as variables affected by changes in flight conditions, such as altitude and environmental parameters from Table 6.

The exemplary algorithm as described herein is designed to compute the optimal trajectory that yields the maximum range while maintaining a minimum velocity at the landing point. The following relations list the State Equations of Motion for a non-rotating earth (NRE) as time derivatives for vehicle changes in elevation (from earth's center), velocity, flight path angle and range:

$$\frac{dr}{dt} = V\sin\gamma, \tag{1a}$$

$$\frac{dV}{dt} = -\left(\frac{D}{m}\right) + g\sin\gamma, \tag{1b}$$

$$\frac{d\gamma}{dt} = \frac{L}{mV} - \frac{g}{V}\cos\gamma + \frac{V}{r}\cos\gamma, \tag{1c}$$

$$\frac{dS}{dt} = V\cos\gamma, \tag{1d}$$

where drag, lift, dynamic pressure, vehicle distance from earth's center and range are respectively expressed as:

$$D = \bar{q}SC_D, \tag{2a}$$

$$L = \bar{q}SC_L, \tag{2b}$$

$$\bar{q} = \frac{1}{2}\rho V^2, \tag{2c}$$

$$r = R_E + h, \tag{2d}$$

and $S = r\theta$. (2e)

The state variables and their descriptions are provided in Table 5 in view 900. Note that eqn. (2c) expresses dynamic pressure, and this quantity is set to a constant value during the constant dynamic pressure arc 260. These relations are provided by R. F. Stengel: *Flight Dynamics* at p. 61 (2004).

For a rotating earth with a rotation rate $\Omega$, the NRE equations of motion for flight path angle $\gamma$ and velocity $V$ can be modified with the following terms added to eqns. (1b) and (1c):

$$\frac{d\gamma}{dt} = \left(\frac{d\gamma}{dt}\right)_{NRE} + 2\cos\varphi\sin\psi + \frac{1}{V}r\Omega^2\cos\varphi(\cos\varphi\cos\gamma + \sin\varphi\sin\gamma\cos\psi) \tag{3a}$$

and $$\frac{dV}{dt} = \left(\frac{dV}{dt}\right)_{NRE} + r\Omega^2\cos\varphi(\cos\varphi\sin\gamma - \sin\varphi\cos\gamma\cos\psi), \tag{3b}$$

where $\varphi$ is the geocentric latitude and $\psi$ is the azimuth.

Figure 10:
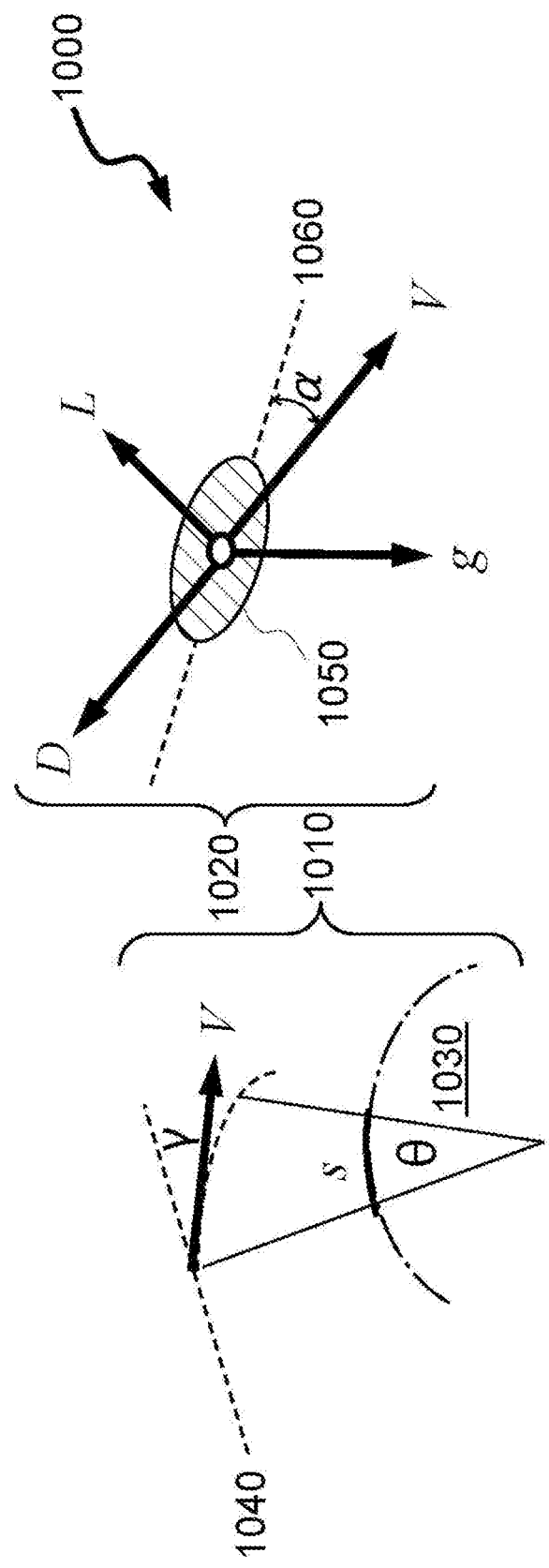
FIG. 10 is a block diagram view of orientation and body forces.

FIG. 10 shows block diagram views 1000 for equations of motion 1010 and body forces 1020. The motion 1010 diagram includes a curve 1030 denoting the earth, and a local horizontal 1040 identifies a reference line for relating trajectory velocity magnitude V offset from the horizontal by flight path angle $\gamma$. The forces 1020 diagram includes a vehicle body 1050 subject to gravitational acceleration g (in relation to the body's mass m) from the earth, the velocity V in relation to the body axis angle 1060 or AoA, and the lift L and drag D forces that act on the body 1050 during its flight.

The output of the computational method is to the angle of attack (AoA) and rate of change of the AoA (rate) history required to shape the vehicle trajectory over the earth's surface before landing thereon or reaching some other altitude suitable for entry into low earth orbit. Note that the AoA for the vehicle denotes orientation difference of its longitudinal axis from the flight path. Its initial value can be set (e.g., to zero) at launch. The AoA rate represents change in AoA with respect to time.

For the vehicle flight control actuator system 170, there are constraints, in particular limits on the maximum value of the angle of attack and rate, a minimum and maximum value of the velocity V and a minimum and maximum value for the flight path angle $\gamma$ at the end of the trajectory. This principle can be implemented by defining a Hamiltonian along with a set of adjoint parameters that act as Lagrange Multipliers, as explained by Luus: *Iterative Dynamic Programming* (https://www.mobt3ath.com/uplode/book/book-21416.pdf, 2000), §§ 10.1 and 11.2.2. The exemplary computational technique incorporates Pontryagin's Minimum Principle from Rao: "... Optimal Control" (http://www.anilvrao.com/Publications/ConferencePublications/trajectorySurveyAAS.pdf. 2010) as well as Vinh. To implement the principle, a Hamiltonian is defined along with a set of adjoint parameters that act as Lagrange Multipliers.

The tables for the US 1962 Standard, 1976 Standard and 1966 Supplemental Atmospheres are comprised of a set of temperatures as a function of a set of geometric (Z) and geopotential altitudes (H). For a given number of rows of data, the geometric altitudes and temperatures are denoted by $Z_i$, $T_i$, where i is the row such that the current trajectory altitude h is between $Z_i$ and $Z_{i+1}$.

Using the geodynamic earth radius $R_{Dp}$ and the ideal gas constant $R_{ideal}$, the pressure P and density $\rho$ are computed as follows:

$$B = \frac{2}{R_{Dp}}, \tag{4a}$$

$$C = \frac{3}{R_{Dp}^2}, \tag{4b}$$

with temperature change from geometric altitude as:

$$L_{Zi} = \frac{T_{i+1} - T_i}{Z_{i+1} - Z_i}, \tag{4c}$$

$$q_1 = h - Z_i, \tag{4d}$$

and $$q_2 = h + Z_i, \tag{4e}$$

If temperature is comparatively invariant with altitude ($|L_{Zi}| > 10^{-6}$), then the following simplifications can be assumed:

$$D = -\frac{R_{ideal}}{L_{Zi}}, \tag{5a}$$

$$a = \frac{T_i}{L_{Zi}} - Z_i, \tag{5b}$$

$$p_1 = -D_{q_1}\left(B + aC - \frac{1}{2}q_2 C\right), \tag{5c}$$

$$p_2 = D(1 + aB + a^2 C), \tag{5d}$$

-continued and $$p = P_i e^{p_1} \left[\frac{T}{T_i}\right]^{P_2}, \quad (5e)$$

where $P_i$ is pressure computed from the previous ($i^{th}$) row (and starting with $P_0$).

Else otherwise with nontrivial temperature variation by altitude, $$T = T_i, \quad (6a)$$

$$D = -\frac{R_{ideal}}{T}, \quad (6b)$$

$$q_3 = h^2 + hZ_i + Z_i^2, \quad (6c)$$

$$q_4 = 1 - \frac{1}{2}Bq_2 + \frac{1}{3}Cq_3, \quad (6d)$$

and $$P = P_i e^{Dq_3 \cdot q_4}. \quad (6e)$$

For both cases, the density is:

$$\rho = \frac{P}{R_{ideal} T}. \quad (6f)$$

The speed of sound $V_{sound}$, Mach Number M, dynamic pressure $\bar{q}$ and the viscosity $\mu$ are then computed with the following equations:

$$V_{sound} = \sqrt{\gamma_{ideal} R_{ideal} T}, \quad (7a)$$

$$M = \frac{V}{V_{sound}}, \quad (7b)$$

$$\bar{q} = \frac{1}{2}\rho V^2 \text{ (from eqn. (2c)},\quad (7c)$$

and $$\mu = \mu_0 \frac{r^{\frac{2}{3}}}{C_{sutherland} + T}. \quad (7d)$$

Partial Derivatives of the Forces Acting on the Body: These forces include gravity, drag and lift that affect the glide path as illustrated in diagram 1020. Gravity acts to direct the body and acceleration towards the center of the earth. This is due to the weight W, which has an associated mass m of the body. At any given point in the trajectory, the weight force is:

$$W = mg. \quad (8a)$$

For a spherical earth, gravitational acceleration is:

$$g = -\frac{\mu}{r^2} = -\frac{\mu}{(R_E + h)^2}. \quad (8b)$$

A fourth order approximation of the gravitational acceleration g for an elliptical earth is given by:

$$f_1 = -\frac{3}{2} J_2 a^2 (3\cos^2\varphi - 1), \quad (9a)$$

$$f_2 = -2 J_3 a^3 \cos\varphi (5\cos^2\varphi - 3), \quad (9b)$$

and $$f_3 = -\frac{5}{8} J_4 a^4 (35\cos^4\varphi - 30\cos^2\varphi + 3), \quad (9c)$$

where a is the equatorial radius of the earth, and the relation for gravitational acceleration combines these factors from eqns. (9a) through (9c) as:

$$g = -\frac{\mu}{r^2}\left[1 + \frac{f_2}{r^2} + \frac{f_3}{r^3} + \frac{f_4}{r^4}\right]. \quad (10a)$$

For both spherical and elliptical gravity cases, the partial derivative with respect to the altitude h is provided by:

$$\frac{\partial g}{\partial h} = \frac{2g}{r}. \quad (10b)$$

For the elliptical gravity case, this is an approximation.

Drag and Lift Coefficients: In general, the drag and lift coefficients can be a function of many different aerodynamic variables. The most common are the altitude, Mach number, Reynolds number and Knudsen number. Generally, the Reynolds number is used in an engineering correlation to model the onset and end altitude of the vehicle boundary layer transition from a laminar to a turbulent flow field. The laminar and turbulent aerodynamic coefficient values are stored in tabular form in the RAM 190 of the vehicle CPM 110 and an appropriate interpolation method is used to find the lift and drag coefficient from those tables.

Figure 11:
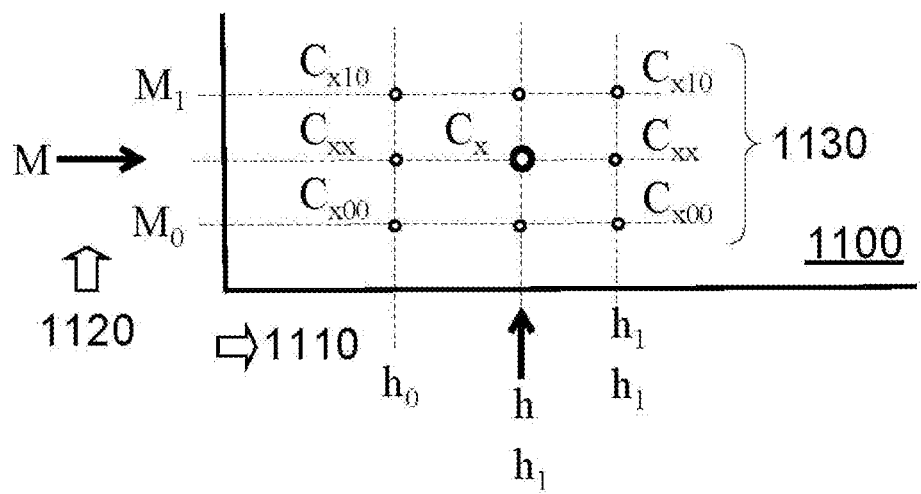
FIG. 11 is a graphical view of an altitude-Mach interpolation grid.

As an example, FIG. 11 shows a graphical view 1100 of a bilinear interpolation grid for Mach number and altitude as variables pair. Altitude 1110 represents the abscissa, while Mach number 1120 denotes the ordinate with the grid 1130 plotting points. First, the two Mach numbers that bound the current Mach number M are found, designated as $M_0$ and $M_1$. Then the two altitudes that bound the current altitude h are found, designated as $h_0$ and $h_1$.

In general, exemplary embodiments provide trajectory shapes for which the flight path angle γ varies smoothly. This is considered to be optimal for a carbon or carbon/silicon fiber based material composition of the thermal protection system (TPS) of the vehicle, from the consideration of minimizing both the aerothermal heating of the TPS and the structural loads exerted on the vehicle. Depending on the planned vehicle velocity V and range of flight, the vehicle may require a thicker TPS on the windward side versus the leeward side of the vehicle.

Computation of the Trajectory Arcs: The exemplary algorithm is designed to find the optimal glide trajectory such as the one shown in FIG. 4 as view 400 further notes that four trajectory points for burnout 445, downturn 465, inflection 475 and landing 490. Trajectory burnout 445 is the end of the boost arc 440 (engine cutoff) and the beginning of the post-boost arc 450. Trajectory point downturn 465 is the end of the glide arc 460 and the beginning of the steer-down arc 470. Trajectory point inflection 475 is the end of the steer-down arc 470 and the beginning of the approach arc 440. Trajectory point target arrival 490 is the end of the trajectory simulation when the altitude h reaches $h_{end}$.

Figure 12:
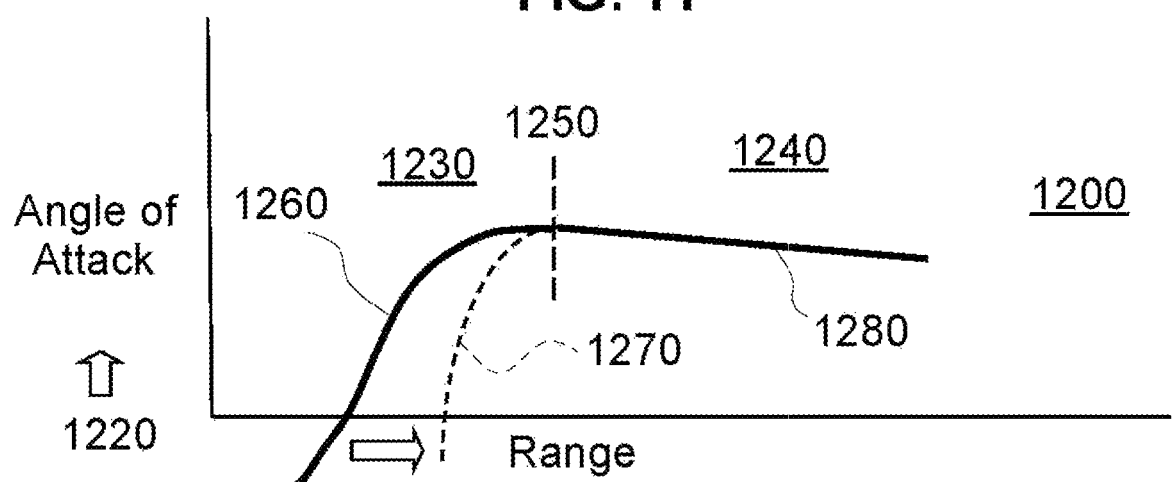
FIG. 12 is a graphical view of angle-of-attack versus range.

FIG. 12 shows a graphical view 1200 for range variation based on angle: Range 1210 identifies the abscissa while angle of attack 1220 denotes the ordinate. A post-boost phase 1230 followed by a glide phase 1240 operate over the range 1210 separated by peak altitude 1250. A trajectory curve 1260 and a glide test curve 1270 approach the inflection point at peak altitude 1250, followed by a glide curve 1280.

Figure 13:
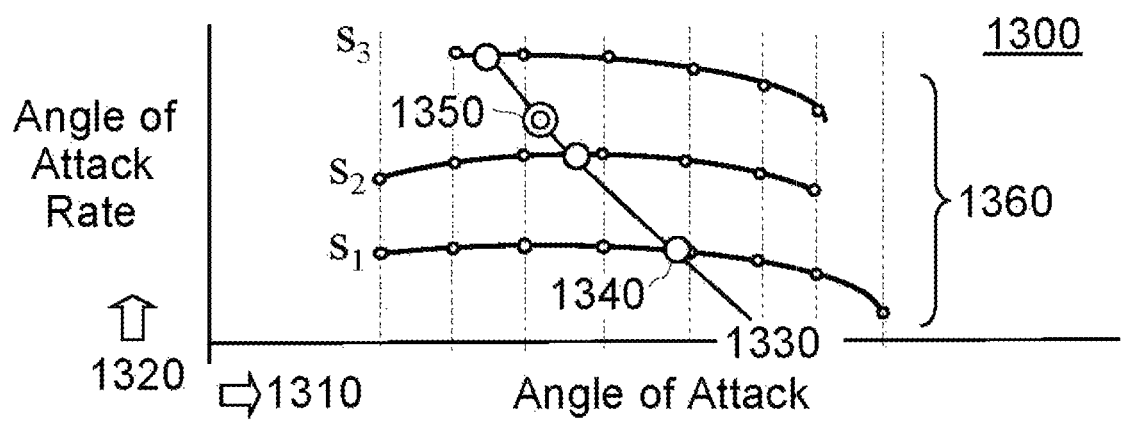
FIG. 13 is a graphical view of AoA rate versus angle-of-attack.

FIG. 13 shows a graphical view 1300 for a bipolynomial Chebyshev interpolation of a surface of trajectory ranges as a function of initial angle of attack and angle of attack rate. Angle of attack denotes the abscissa 1310 while AoA rate denotes the ordinate 1320. An intersecting diagonal line 1330 connects local maximum points 1340 along with an optimal intersection 1350 of AoA and rate pair based on a series of polynomial interpolations 1360. For the first part of the optimal steering path computation between trajectory points burnout 445 and downturn 465, initial values for AoA 1310 and AoA rate 1320 are chosen with a constant interval between them.

For each value of AoA and AoA rate, a trajectory simulator flies the trajectory from trajectory point burnout 445 to the downturn 465. The quantity to be maximized (such as range or velocity) is then recorded. When all of the trajectory simulations are complete, a polynomial interpolation 1360 on AoA is performed to find the value of AoA that yields the maximum quantity value corresponding to that initial AoA rate. All of the local maximum values are then connected by diagonal line 1330. A polynomial interpolation on AoA rate is then performed to find the optimal pair 1350 of values (AoA, AoA rate) that yields the optimal (maximum) quantity desired.

During the glide trajectory arc, the vehicle performs a test to see if a specified altitude h or velocity V has been reached. When this test passes the vehicle has reached the down turn point 465 in view 400. At that time another set of trajectory optimization computations are performed starting with another family of initial guesses for AoA $\alpha_0$ and the AoA rate $d\alpha_0/dt$. Likewise, another optimal pair of values (AoA, AoA rate) is chosen to yield the optimal descent arc trajectory.

This process is also illustrated in FIG. 14 that shows a graphical view 1400 of steer-down 470 and landing 490 maneuver constraints. Range denotes the abscissa 1410 while altitude 1420 constitutes the ordinate. The approach trajectory 1430 shows descent from a maximum altitude 1440 corresponding to the end of glide 480. At a local horizontal 1450, the trajectory 1430 reaches an inflection point 1460 corresponding to trajectory point 475 while pointing velocity V along a flight path angle γ so as to reach the landing point 1470 that corresponds to target arrival 490.

Trajectory point target arrival 1470 is the end of the trajectory when the altitude h reaches $h_{end}$. Also the proportional navigation steering is designed to cause the vehicle to approach the final destination point 1470 such that the following constraints for flight path angle and velocity are satisfied:

$$\gamma_{min} \leq \gamma \leq \gamma_{max}, \tag{11a}$$

$$\text{and } V_{min} \leq V \leq V_{max}. \tag{11b}$$

FIG. 15 shows a tabular view 1500 for Table 6 that lists Trajectory Optimization Required Input Parameters. These include maximum and/or minimum limits for AoA and AoA rate, path angle and velocity V.

Returning to the Lagrange multipliers, the form of the Hamiltonian presented herein as $\mathcal{H}$ can be expressed as:

$$\mathcal{H} = \sum p_i f_i \quad i = 1, 2, 3, \dots, \tag{12a}$$

where $p_i$ series are the adjoint variables (Lagrange multipliers), and the functions $f_i$ are in general dependent on the time, state and control variables. Also in general, the Hamiltonian is a constant. For this algorithm, the state variables are velocity V, altitude h, surface range S and flight path angle γ. The control variable is the angle of attack α (or AoA). Thus, one has $$\mathcal{H} = p_h \frac{dh}{dt} + p_V \frac{dV}{dt} + p_\gamma \frac{d\gamma}{dt}. \tag{12b}$$

Co-State Equations: Also from the Minimum Principle one has the following co-state equations for the adjoint variables:

$$\frac{dp_h}{dt} = -\frac{d\mathcal{H}}{dh} \tag{13a}$$

$$\frac{dp_\gamma}{dt} = -\frac{d\mathcal{H}}{d\gamma}, \tag{13b}$$

$$\frac{dp_S}{dt} = -\frac{d\mathcal{H}}{dS}, \tag{13c}$$

and $$\frac{dp_V}{dt} = -\frac{d\mathcal{H}}{dV}. \tag{13d}$$

Rewriting and performing the partial derivative operations denoted in eqns. (13a)-(13d) on the NRE state eqns. (1a)-(2e) gives:

$$\frac{dp_h}{dt} = r_1 p_h + r_2 p_\gamma + r_3 p_S + r_4 p_V, \tag{14a}$$

$$\frac{dp_\gamma}{dt} = s_1 p_h + s_2 p_\gamma + s_3 p_S + s_4 p_V, \tag{14b}$$

$$\frac{dp_S}{dt} = 0, \tag{14c}$$

and $$\frac{dp_V}{dt} = t_1 p_h + t_2 p_\gamma + t_3 p_S + t_4 p_V. \tag{14d}$$

The altitude coefficients are:

$$r_1 = 0, \tag{15a}$$

$$r_2 = -\frac{1}{mV}\frac{\partial L}{\partial h} + \left(\frac{V}{r^2} + \frac{1}{V}\frac{\partial g}{\partial h}\right)\cos\gamma, \tag{15b}$$

$$r_3 = 0, \tag{15c}$$

and $$r_4 = \frac{1}{m}\frac{\partial D}{\partial h} + \frac{\partial g}{\partial h}\sin\gamma. \tag{15d}$$

The path angle coefficients are:

$$s_1 = -V\cos\gamma, \tag{16a}$$

-continued $$s_2 = \left(\frac{V}{r} - \frac{g}{V}\right)\sin\gamma, \quad (16b)$$

$$s_3 = V\sin\gamma, \quad (16c)$$

and $$s_4 = g\cos\gamma. \quad (16d)$$

The velocity coefficients are:

$$t_1 = -\sin\gamma, \quad (17a)$$

$$t_2 = \frac{L}{mV^2} - \frac{1}{mV}\frac{\partial L}{\partial V} - \left(\frac{1}{r} + \frac{g}{V^2}\right)\cos\gamma, \quad (17b)$$

$$t_3 = -\cos\gamma, \quad (17c)$$

and $$t_4 = \frac{1}{m}\frac{\partial D}{\partial V}. \quad (17d)$$

Control State Equation: To find the optimal trajectory, one finds the minimum/maximum of the Hamiltonian derivative with respect to the angle of attack and set it equal to zero:

$$\frac{\partial \mathcal{H}}{\partial \alpha} = \frac{\partial}{\partial \alpha}\left[p_\gamma \frac{d\gamma}{dt} + p_V \frac{dV}{dt}\right] = 0. \quad (18a)$$

Thus, eqn. (18a) can be rewritten as:

$$p_\gamma = \left[\frac{\frac{\partial D}{\partial \alpha}}{\frac{\partial L}{\partial \alpha}}\right] p_V V. \quad (18b)$$

To find the time rate of change of the angle of attack (AoA rate) or $d\alpha/dt$, one assigns:

$$E_0 = \left[\frac{1}{\frac{\partial L}{\partial \alpha}}\right] \equiv \left[\frac{\partial L}{\partial \alpha}\right]^{-1}, \quad (19a)$$

$$E_1 = 2C_{D\alpha}\alpha + C_{Db}, \quad (19b)$$

$$E_2 = E_0 E_1, \quad (19c)$$

and $$E_3 = 2C_{D\alpha}. \quad (19d)$$

Using eqns. (1b) and (1c) and (19a)-(19b), and taking the time derivatives of both sides of eqn. (18b), gives the relation for the time rate of change of the angle of attack (AoA rate):

$$\frac{d\alpha}{dt} = \frac{1}{E_3 V}\left[\frac{\left(\frac{dp_\gamma}{dt}\right) - E_2\left(\frac{dp_V}{dt}\right)V}{E_0 p_V} - E_1 \frac{dV}{dt}\right]. \quad (19e)$$

Recall that pressure P and density $\rho$ are computed in state eqns. (4a)-(6e). From eqns. (2c) and (4a)-(6e) along with eqns. (7a)-(7d), one finds the following partial derivatives of the density $\rho$ with respect to altitude: If ($|L_{Zi}| > 10^{-6}$) then:

$$\beta_A = (hC - B - aC)D + (p_2 - 1)\frac{L_{Zi}}{r}, \quad (20a)$$

else $$\beta_A = \left[q_4 + q_1\left(-\frac{1}{2}B + \frac{1}{3}C(2h + Z_i)\right)\right]D, \quad (20b)$$

and $$\frac{\partial \rho}{\partial h} = \beta_A \rho, \quad (20c)$$

where A corresponds to the number value of the atmosphere table selected (or input) in view 400 as Table 2.

The partial derivatives of the dynamic pressure derived from eqn. (2c) are:

$$\frac{\partial \bar{q}}{\partial h} = \beta_A \bar{q}, \quad (21a)$$

$$\frac{\partial \bar{q}}{\partial V} = \frac{2\bar{q}}{V}, \quad (21b)$$

and the partial derivatives for the Mach number from eqn. (7b) are:

$$\frac{\partial M}{\partial h} = m_A \overline{M}, \quad (22a)$$

where $$m_A = -\frac{L_{Zi}}{2T}, \quad (22b)$$

and $$\frac{\partial \overline{M}}{\partial V} = \frac{1}{V_{sound}}. \quad (22c)$$

Using eqns. (2a)-(2c) and eqns. (20a)-(20b), one can write expressions for the partial derivatives of the Drag and Lift Force. The drag derivatives with respect to altitude and velocity V are:

$$\frac{\partial D}{\partial h} = \beta_A D + \bar{q}S\frac{\partial C_D}{\partial h}, \quad (23a)$$

and $$\frac{\partial D}{\partial V} = \frac{2D}{V} + \bar{q}S\frac{\partial C_D}{\partial V}, \quad (23b)$$

whereas the corresponding lift derivatives are:

$$\frac{\partial L}{\partial h} = \beta_A L + \bar{q}S\frac{\partial C_L}{\partial h}, \quad (24a)$$

and $$\frac{\partial L}{\partial V} = \frac{2L}{V} + \bar{q}S\frac{\partial C_L}{\partial V}. \quad (24b)$$

Drag and Lift Coefficients: In general, the drag and lift coefficients can be a function of many different aerodynamic variables. The most common are the altitude, Mach number, Reynolds number and Knudsen number. Also for each or all of these, as the trajectory angle of attack changes, so do the drag and lift coefficient values. Because many trajectory simulations are frequently found in tabular form, that is the input requirement for this algorithm. For the exemplary algorithm, one assumes that the tables are a function of altitude and Mach or Knudsen number from which to compute a bilinear interpolation of Mach number and altitude as exemplified in grid view 1100.

The exemplary algorithm provides a trajectory simulation that accounts for the various models of the forces that the vehicle (body) is subjected to during the unpowered portion of its flight. The calculation of these forces requires vehicle body, earth, gravity, atmosphere and aerodynamic coefficient models. The drag and lift coefficients are respectively provided in the forms:

$$C_D = C_{Da}\alpha^2 + C_{Db}\alpha + C_{Dc} \qquad (25a)$$

$$\text{and } C_L = C_{Ld}\alpha + C_{De} \qquad (25b)$$

where $\alpha$ is the angle of attack (AoA) and the components $C_{Da,b,c}$ and $C_{Ld,e}$ of the total drag and lift coefficients (listed in Table 1) are input as tabular functions of Mach or Knudsen number and altitude. In the grid 1130, there are four coefficient values associated with the four possible pairings of the two Mach number bounds and the two altitude bounds. These coefficients are $C_{x00}$, $C_{x01}$, $C_{x10}$ and $C_{x11}$, where x is either Da, Db or Dc for the Drag coefficient or Ld or Le for the Lift coefficient.

Finally $C_x$ is the desired coefficient associated with the pair Mach number M and altitude h. The equations used to find $C_x$ are:

$$\Delta \overline{M} = M_1 - M_0, \qquad (26a)$$

$$\Delta M = M - M_0, \qquad (26b)$$

$$\Delta \overline{h} = h_1 - h_0, \qquad (26c)$$

$$\text{and } \Delta h = h - h_0. \qquad (26d)$$

From these, the adjustments based on Mach number are:

$$S_{Mx} = \frac{C_{x10} - C_{x00}}{\Delta M}, \qquad (27a)$$

and $$S_{My} = \frac{C_{x11} - C_{x01}}{\Delta M}. \qquad (27b)$$

This yields coefficients:

$$C_{xx} = C_{x00} + S_{Mx}\Delta M, \qquad (28a)$$

$$\text{and } C_{xy} = C_{x01} + S_{My}\Delta M. \qquad (28b)$$

This leads to coefficient relation:

$$C_x = C_{xx} + \frac{C_{xy} - C_{xx}}{\Delta \overline{h}}. \qquad (29a)$$

Substituting, eqn. (29a) can be rewritten as:

$$C_x = C_{x00} + S_{Mx}\Delta M + S_h\Delta h + \Delta S_M \Delta M \Delta h, \qquad (29b)$$

where $$S_h = \frac{C_{x01} - C_{x00}}{\Delta \overline{h}}, \qquad (29c)$$

and $$\Delta S_M = \frac{S_{My} - S_{Mx}}{\Delta \overline{h}}. \qquad (29d)$$

Performing the partial derivative operations with respect to altitude and velocity V on eqn. (29b) provides:

$$\frac{\partial C_x}{\partial h} = S_{Mx}\frac{\partial M}{\partial h} + S_h + \Delta S_M\left(\frac{\partial M}{\partial h}\Delta h + \Delta M\right), \qquad (30a)$$

and $$\frac{\partial C_x}{\partial V} = S_{Mx}\frac{\partial M}{\partial V} + \Delta S_M\left(\frac{\partial M}{\partial V}\Delta h\right). \qquad (30b)$$

The eqns. (30a) and (30b) are used for the three drag coefficient components $C_x = C_{Da}$, $C_x = C_{Db}$ and $C_x = C_{Dc}$. They are also used for the two lift coefficient components $C_x = C_{Ld}$ and $C_x = C_{Le}$.

Glide Path Angle of Attack Requirement: For the glide arc 460 of the trajectory 430, the flight path angle $\gamma$ and the time rate of change of the flight path angle is assumed to be nearly zero. Using the initial glide velocity V and flight path angle $\gamma$, the test angle of attack (AoA) required to maintain constant dynamic pressure can be computed using the flight path angle constraints along with eqns. (25a), (25b), (2b), (2c), (3a) and (3b).

Setting the time rate of change of the dynamic pressure from eqn. (2c) to zero and using the standard or supplemental atmosphere exponential form of the density $\rho$ (for each $i^{th}$ altitude window) provides:

$$\frac{d\overline{q}}{dt} = \frac{d}{dt}\left[\frac{1}{2}\rho V^2\right] = \frac{d}{dt}\left[\frac{1}{2}\rho_0 \cdot e^{-\beta_A h} \cdot V^2\right]. \qquad (31a)$$

Setting path angle in eqn. (1c) to zero ($\gamma=0$) and using eqn. (31a) provides the relations:

$$a\alpha^2 + b\alpha + c = 0, \qquad (31b)$$

$$d\alpha + e = f, \qquad (31c)$$

and $$f = \frac{m}{\overline{q}S}\left(g - \frac{V^2}{r}\right), \qquad (31d)$$

where coefficients a=$C_{Da}$, b=$C_{Db}$, c=$C_{Dc}$, d=$C_{Dd}$ and e=$C_{De}$. Solving for AoA difference $\alpha - \alpha_{test}$ gives a test AoA:

$$\alpha_{test} = \mu\sqrt{\left|\frac{b(e+f) - cd}{ad}\right|}. \qquad (31e)$$

Consequently, eqn. (31e) is used to set the initial glide arc's AoA and throughout the glide arc 460 to maintain the body on a constant dynamic pressure course 330. For the post-boost arc 450, all of the equations detailed are used. For the steer-down arc 470, all of the equations are used except eqn. (31e). For the initial glide velocity V and flight path angle γ, the exemplary process computes the test angle of attack required to maintain constant dynamic pressure using the motion eqns. (1a) through (3b).

Optimal Arcs Between Trajectory Points: To begin, the first part of the trajectory optimization computation between trajectory points burnout 445 and downturn 465, initial values for $\alpha_0$ and $d\alpha_0/dt$ are set. The trajectory begins at trajectory point burnout 445, the beginning of the post-boost arc 450. During the Post-Boost arc 450, the test AoA of eqn. (31e) is computed and compared to the current trajectory AoA using the test described below.

FIG. 13 shows a graphical view 1300 with the polynomial interpolation for a set of images versus the AoA 1310 as the abscissa for a family of AoA rates 1320 as the ordinate. An interpolation line 1330 passes interpolated points 1340 of AoAs and AoA rates yielding an optimum point 1350 based on separate series 1360 for set AoA values. The optimum point 1350 denotes the final pair of AoA and AoA rate with maximum range determined through interpolation, with flight AoA being not less than the test AoA.

$$\alpha \geq \alpha_{test}. \tag{32a}$$

When the test passes, the following tests are performed:

$$\alpha_{test} \geq 0, \tag{32b}$$

$$\text{and } \alpha \leq \alpha_{max}. \tag{32c}$$

If these tests pass, then the flight range S is stored. This process is repeated across a range of AoAs and AoA rates.

To summarize the process, one can set initial values of AoA and AoA rate change as:

$$\alpha_0 = 0, \tag{33a}$$

and $$\frac{d\alpha_0}{dt} = 0, \tag{33b}$$

while $$(d\alpha_0/dt \leq (d\alpha/dt)_{max}) \ \{ \tag{33c}$$

while $$\alpha_0 \leq \alpha_{max} \ \{ \tag{33d}$$

Run trajectory using initial AoA $\alpha_0$ and initial AoA rate $d\alpha_0/dt$ from first and second trajectory points: Perform test of eqn. (32b).

If tests of eqns. (32c) and (33a) pass, store range S, initial AoA $\alpha_0$ and initial AoA rate $d\alpha_0/dt$. Increment the initial AoA:

$$\alpha_0 = \alpha_0 + \Delta\alpha_0. \tag{33e}\}$$

Perform polynomial interpretation on initial AoA rate $d\alpha_0/dt$ to find maximum range S and store initial AoA $\alpha_0$ and initial AoA rate $d\alpha_0/dt$.

$$\frac{d\alpha_0}{dt} = \frac{d\alpha_0}{dt} + \Delta\frac{d\alpha_0}{dt}. \tag{33f}\}$$

Perform polynomial interpolation on $d\alpha_0/dt$ to find maximum range S and store initial AoA $\alpha_0$ and initial AoA rate $d\alpha_0/dt$, which can be used to fly the simulation trajectory to trajectory point downturn 465.

Optimal Arcs Between Trajectory Points: To begin the second part of the trajectory optimization computation, an initial guess for initial AoA $\alpha_0$ and initial AoA rate $d\alpha_0/dt$ are set. During the steer-down arc 470, the altitude 420 is compared to the current trajectory altitude using the following test:

$$h \leq h_{test}. \tag{34a}$$

When the test passes, the following constraints are checked (see view 1000):

$$\gamma_{min} \leq \gamma \leq \gamma_{max}, \tag{34b}$$

$$\text{and } V_{min} \leq V \leq V_{max}. \tag{34c}$$

To summarize the process, one has: a while loop for eqns. (33a) and (33b).

While inequality $d\alpha_0/dt \leq (d\alpha/dt)_{max}$ holds under eqn. (33c):

Calculate maximum initial AoA $\alpha_0$ through eqn. (33d).

Run Trajectory using initial AoA $\alpha_0$ and initial AoA rate $d\alpha_0/dt$ from trajectory point burnout 445 to trajectory point downturn 465.

Perform test of eqn. (34a).

If tests of eqns. (34b) and (34c) pass, store range S, AoA $\alpha_0$ and AoA rate $d\alpha_0/dt$ in RAM 190.

Increment eqn. (33e)}.

Perform polynomial interpolation on initial AoA rate $d\alpha_0/dt$ to find maximum range S, and store initial AoA $\alpha_0$ and initial AoA rate $d\alpha_0/dt$ with eqn. (33f).

Generally, the exemplary algorithm is straightforward to implement on a laptop computer via a portable computer programming language (such as C++) and is fast compared to commercial software packages. The exemplary algorithm enables the fast execution of many trajectories such as for a Monte Carlo analysis and provides a robust way to account for many realistic aspects of a trajectory simulation such as a rotating WGS84 elliptical earth and gravity model. The process also accounts for actual aerodynamic coefficients that are functions of Mach or Knudsen number, altitude and angle of attack. The code based on the exemplary algorithm can also accommodate several different Reynolds number transition criteria. This is reflected in the input laminar and turbulent aerodynamic coefficient tables.

Additionally, the exemplary algorithm incorporates real atmospheres such as the 1962 and 1976 Standard and 1966 Supplemental atmospheres. Generally, forecast departures from the standard atmospheres and winds can be input into the algorithm to find the optimal trajectory for actual conditions that a physical aerospace vehicle would actually encounter. The algorithm can be incorporated into an on board steering software package stored in the vehicle's RAM 190 and executed by the CPM 110 to zero out small corrections needed due to errors in the assumptions made to generate the preplanned trajectory.

The exemplary algorithm provides many input options to tailor the algorithm to specific needs of the mission planner. Exemplary embodiments can be used by aerospace companies and by university engineering departments for trajectory optimization. It is possible that the exemplary process can be incorporated in a guidance, navigation and control package of prototype vehicles and commercial powered and unpowered glide vehicles. The algorithm incorporated in exemplary embodiments is fast, easy to implement, can be executed on a laptop computer and does not require operator intervention.

A code has been generated and tested with an ANSI C++ program on a small, lightweight laptop computer. The ANSI C++ programming language is currently a standardized language which is portable across most computer systems. The exemplary computational technique provides many input options to tailor the optimal steering path to different possible specified vehicle flights.

Exemplary embodiments can be used for a hypersonic vehicle relating to trajectory optimization analyses. It is possible that the exemplary process can be incorporated in a guidance, navigation and control package of prototype vehicles and commercial powered and unpowered glide vehicles. This computation technique is intended to be fully autonomous and to enable changes to the intended destination while the vehicle is in flight.

In summary, exemplary embodiments provide a computer-implemented method for trajectory steering a vehicle in flight by an optimal path to a destination. The method includes incorporating physical constants; setting initial angle of attack (AoA) and initial AoA rate; incrementing flight AoA; measuring operation parameters; establishing a flight trajectory; calculating an optimal trajectory; comparing flight trajectories; and commanding flight control.

The plurality of physical constants include for gravity and atmospheric conditions, the latter typically provided in tabular form. The flight AoA increments from the initial AoA and any prior increments. The plurality of operation parameters of the vehicle includes pressure, velocity and flight path angle. The flight trajectory denotes the path of the vehicle to its destination based on the operation parameters using the physical constants. The optimal trajectory is based on with altitude (based on physical constants) and velocity (based on measured operation parameters) of the vehicle. The flight trajectory is compared to the optimal trajectory as a steering correction by altering the flight AoA. The vehicle's flight control involves executing the steering correction at the flight AoA.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method for in-flight trajectory steering a vehicle to a target destination, said method comprising:

incorporating a plurality of physical constants for gravitational acceleration and atmospheric conditions;

setting initial angle of attack (AoA) and initial AoA rate for the vehicle along an initial trajectory as respective flight AoA and flight AoA rate;

incrementing said flight AoA from said initial AoA and prior increments;

measuring a plurality of operation parameters of the vehicle, including measured dynamic pressure, measured altitude, measured velocity and measured flight path angle;

establishing an operational glide trajectory to the target destination based on said operation parameters using said physical constants from said initial trajectory;

calculating an optimal trajectory with estimated altitude and estimated velocity by setting a control state as $$p_\gamma = \left[\frac{\partial D/\partial \alpha}{\partial L/\partial \alpha}\right] p_V V,$$

such that $\alpha$ is said AoA as control variable, $p_i$ is an adjoint variable with subscript i being $\gamma$ for flight angle and V for velocity, D is drag and L is lift;

comparing said operational glide trajectory to said optimal trajectory as a steering correction for altering said flight AoA and said flight AoA rate; and commanding flight control of the vehicle to execute said steering correction of said flight AoA and said flight AoA rate.

2. The method according to claim 1, wherein said measuring operation includes determining measured velocity from said measured dynamic pressure and deriving air density from said measured altitude.

3. The method according to claim 1, wherein said measuring operation is performed by onboard sensors.

4. The method according to claim 1, wherein said incrementing operation establishes an increment limit for terminating said measuring operation.

5. The method according to claim 1, wherein said establishing operation includes replacing said steering correction for the target destination with an alternate steering correction to an alternate destination via the comparing operation.

6. The method according to claim 1, wherein said setting and establishing operations include receiving global positioning system (GPS) signals for establishing vehicle position in said operational glide trajectory to adjust said steering correction.

7. The method according to claim 1, wherein said calculating operation further includes incorporating said flight path angle.

8. The method according to claim 1, wherein said comparing operation further includes setting said flight AoA to be not less than a test AoA based on drag coefficients while in a glide path for said operational glide trajectory.

9. The method according to claim 1, wherein said establishing operation further includes calculating lift and drag forces on the vehicle from said operation parameters.

10. The method according to claim 1, wherein said physical constants and said operation parameters are stored in random access memory (RAM).

11. The method according to claim 1, wherein said physical constants further include an interpolative selection of atmospheric tables based said measured altitude and season.

12. The method according to claim 1, wherein said calculating operation employs Pontryagin principle and Chebyshev polynomial interpolation.

13. The method according to claim 1, wherein said measuring operation further includes establishing vehicle position.

14. The method according to claim 1, wherein said measuring operation further includes subtracting an absolute velocity difference between said estimated and said measured velocities determining whether said absolute difference exceeds a set tolerance.

15. The method according to claim 1, wherein said calculating operation further includes revising said flight AoA and said flight AoA rate.

16. The method according to claim 1, wherein said incorporating operation further includes adjusting said gravitational acceleration based on earth's geometry.

* * * * *